3 Sheets—Sheet 1.
F. E. SICKELS.
Steam Engine.
No. 907. Reissued Feb. 21, 1860.
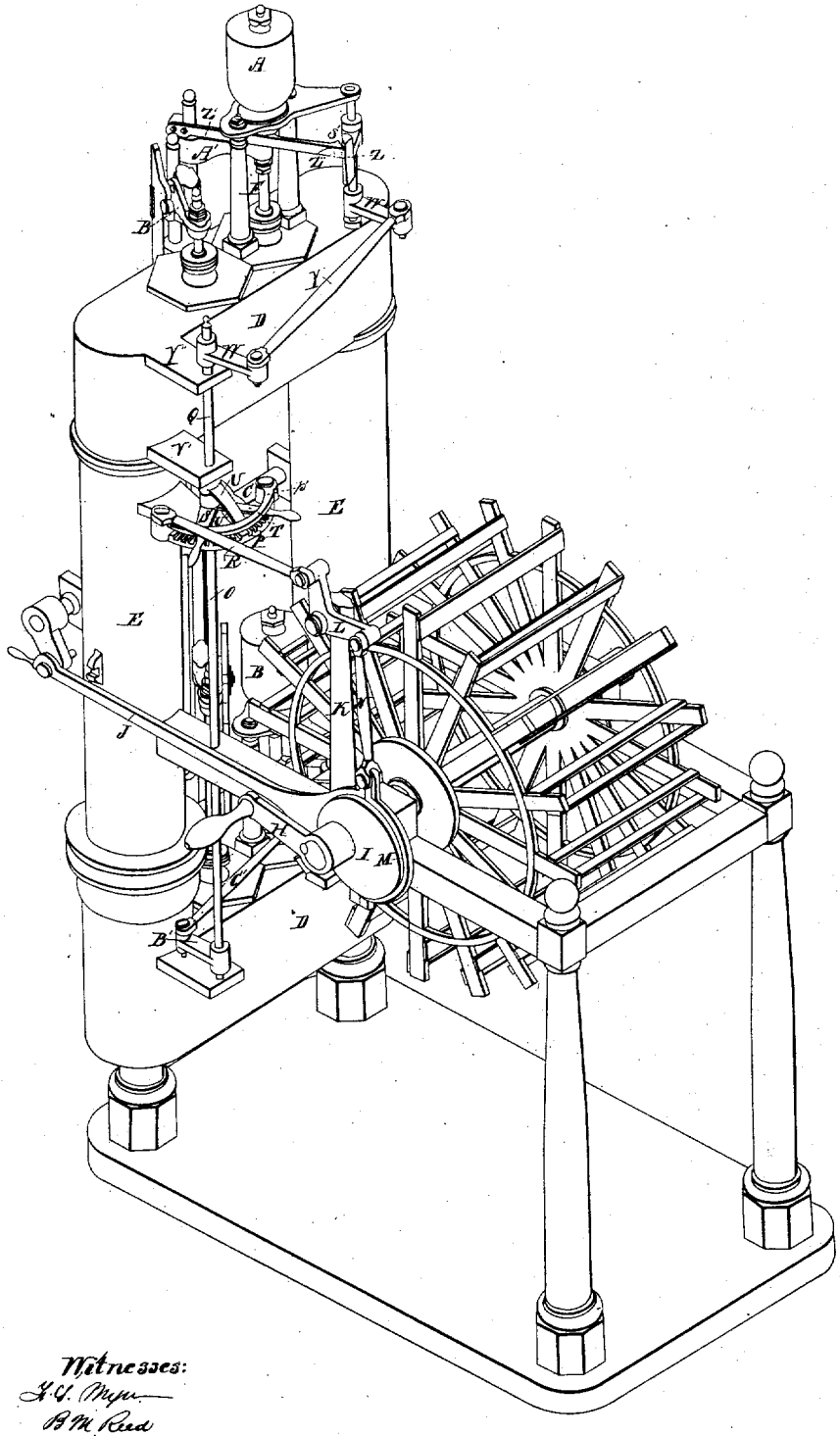
Witnesses:
J. G. Myers
B. M. Reed
Inventor:
F. E. Sickels
N. PETERS. Photo-Lithographer, Washington, D. C.

3 Sheets—Sheet 2.
F. E. SICKELS.
Steam Engine.
No. 907,
Reissued Feb. 21, 1860.
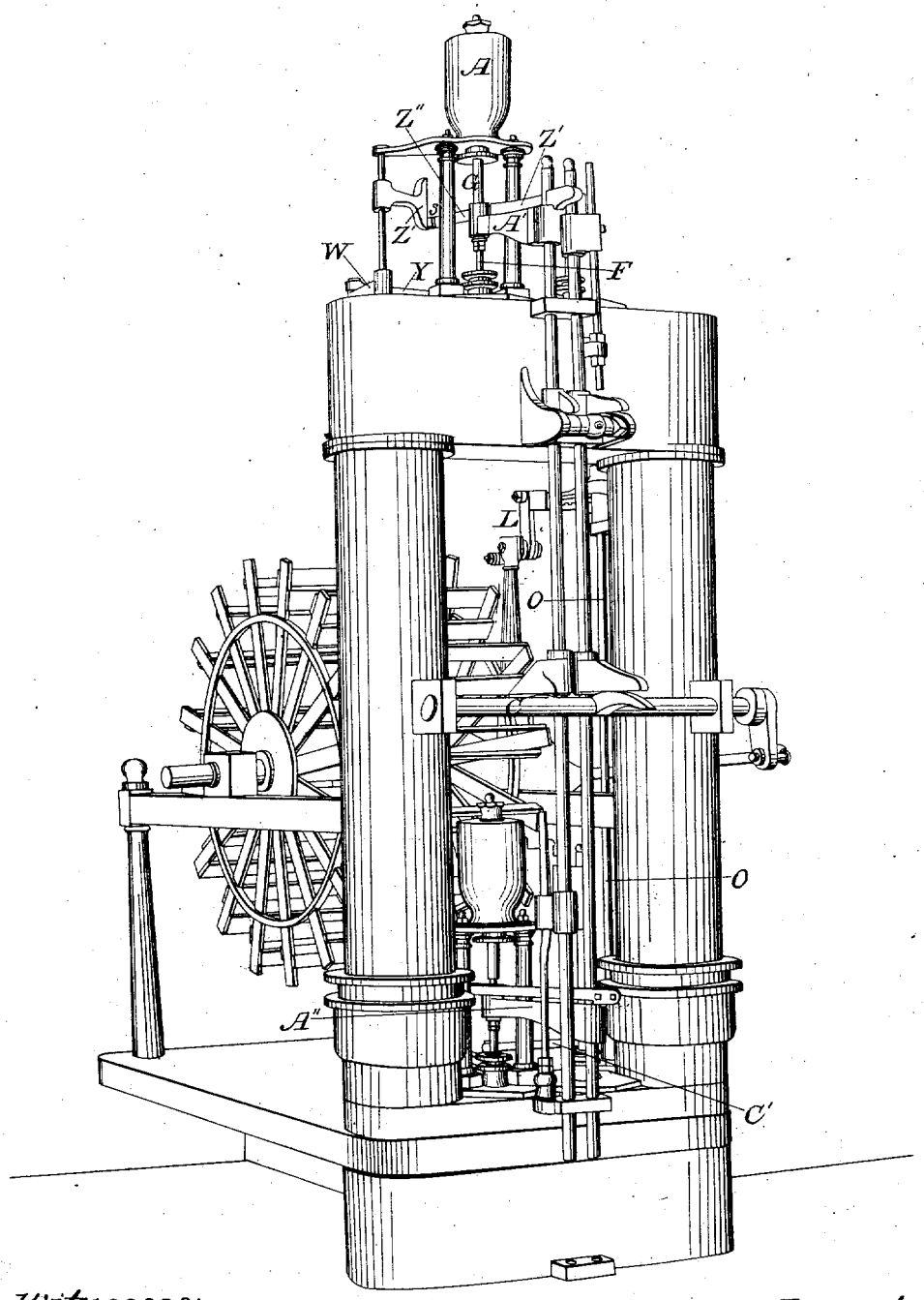
Witnesses:
Inventor:
F. E. Sickels
N. PETERS, Photo-Lithographer, Washington, D. C.

F. E. SICKELS.
Steam Engine.
No. 907.
Reissued Feb. 21, 1860.
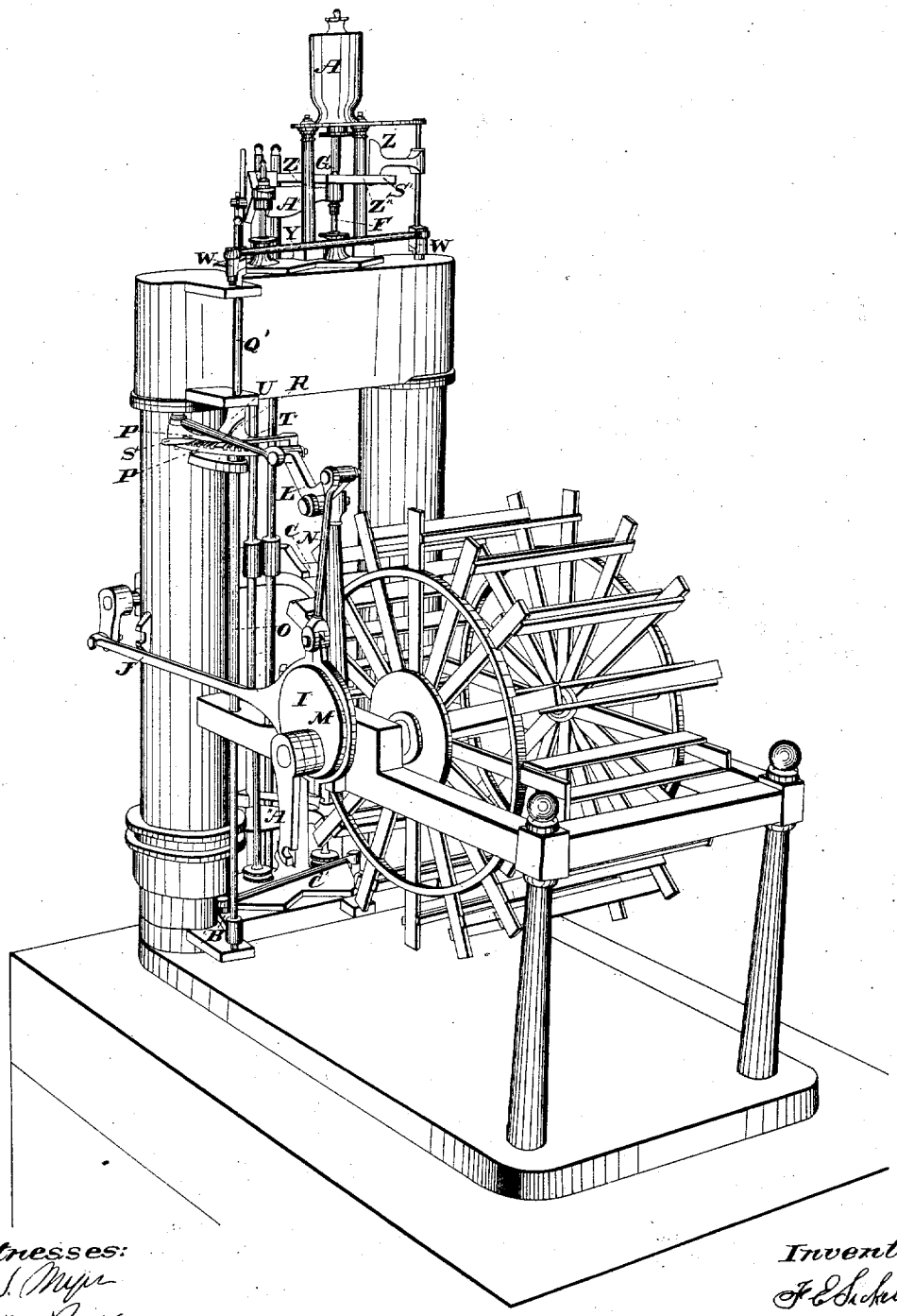
Witnesses:
G. S. Myer
B. M. Reed
Inventor:
F. E. Sickels
N. PETERS. Photo-Lithographer. Washington, D. C.

UNITED STATES PATENT OFFICE.

FREDERICK E. SICKELS, OF NEW YORK, N. Y.

IMPROVEMENT IN STEAM-ENGINES.

Specification forming part of Letters Patent No. 4,201, dated September 19, 1845; extended seven years; Reissue No. 907, dated February 21, 1860.

DIVISION NO. 1.

*To all whom it may concern:*

Be it known that I, FREDERICK ELLSWORTH SICKELS, of the city, county, and State of New York, have invented a new and useful Improvement in Steam-Engines; and I do hereby declare that the following is a full, clear, and exact description of the character thereof which distinguishes it from all other things before known, and of the manner of making and using the same, reference being had to the accompanying drawings, which make a part of this specification.

The nature of my invention consists in an adjustable—that is, adjustable while the engine is in motion—expansion of steam with the aid of a motion that I call an "independent" motion, (because it is not controlled by a lifter-motion that approaches to a state of rest as the piston of the engine approaches the middle of the cylinder, and is therefore able to act when such motion alone would be inefficient,) to determine when a weight or spring (or any equivalent force which has previously been brought into position to act) shall commence to close a separate moving cut-off valve for each end of the cylinder, (thus allowing each valve to move quick in closing without acting on the other, and also avoiding expanding the steam in the connecting-pipe,) the whole operating to effect an efficient adjustable expansion of steam in steam-engines.

In the accompanying drawings, Sheets 1, 2, 3, three views are shown of this improvement in connection with others patented to me on the same day as this, and they will be described in part to facilitate the explanation of the improvement herein patented, notwithstanding it may be used without them.

The same letters refer to the same parts in each figure.

F is a valve rod or stem having a piston or plunger attached to its upper end, operating within a reservoir, A, shaped smaller at the bottom, which may confine the fluid contained therein, substantially in the same manner as described in the patent granted to me the 20th of May, 1842, so as to regulate the velocity of a falling weight connected to the stem, that is sufficient to overcome all friction in closing the valve, which weight if not furnished by or with the valve selected should be added thereto. To this rod or stem the valve must be attached. Either single, double, or slide valves may be used. A spring, Z′, has a catch-piece, Z″, connected to it that fits into a notch in the stem and extends beyond, which piece, Z″, has a curved projection, S′, at the extreme end, against which the outer face of the arm or wiper Z strikes as it vibrates on its vertical axis. The outer face of this arm or wiper is parallel with its shaft or axle, and is of greater length than the motion of the lifter, so that it can act upon the curved projection on the catch-piece Z″ as it is carried up and down by the lifter, so as to determine the time when the weight or other independent force shall close the valve.

The vibratory motion of the arm or wiper Z is obtained, as shown in the drawings, in the following manner: On its axle there is an arm, W, connected by a rod, Y, with a similar arm, W′, on the upper end of a vertical shaft, Q, which has a spring-arm, T, at its lower end, (the outer end handle form,) with its under face provided with a fillet or catch to fall into the teeth on the upper face of the sector P, that vibrates on the shaft Q, that is held by means of arms U U, that project from two collars that turn one on the lower end of this shaft Q and the other on the upper end of a corresponding shaft, O, below it. From one end of this sector a connecting-rod, R, extends to one arm of a bell-crank, L, the other arm of which is connected by a rod, N, with the strap M of the eccentric I, and at right angles to the eccentric-rod J, that operates the rock-shaft C of the lifters A′ A″, so that the sector P, with the parts deriving motion from it, are moving while the lifters are in a state of rest, and therefore the liberation of the valve will be more rapid and can be regulated with more accuracy at this period of the stroke of the piston than if this lifter-motion alone was used. The shaft O, which is below, has a spring-arm, S, similar and corresponding to the one, T, before described, and at its lower end an arm, B′, and connecting-rod, C′, corresponding with the arm W and rod Y above, and all the other corresponding parts that work the cut-off valve for this end of the cylinder are substantially the same as the parts above described for the other end of the cylinder. The sector P has a plate, P′, above and parallel with it for the purpose of strength and to act as a guard for the spring-arms S T. The face of the sector P is provided with two sets of teeth, each extending from the middle or arms U U to the ends, and the length of each part of the sector is such that the motion of the spring-arms S T from one extremity to the other of the sector shall shift the position of the arm or wiper Z and the corresponding one below, so that when the spring-arms are at the outer end of the segment the arms or wipers shall vibrate without permitting the weights to move the valves to cut off, and by moving them toward the middle the extent of the cut-off shall be reduced from the maximum to the minimum—that is to say, to cut off from the greatest to the least portion of the stroke.

It will be evident from the foregoing that any motion derived from any part of the engine may be substituted for the motion of the arms or wipers, provided it has motion as distinguished from the lifter-motion—as, for instance, instead of the horizontal vibratory motion of the arms or wipers, the time when the weight may be permitted to act to close the cut-off valve may be regulated by a vertical descending motion as the lifter rises, and in this case it will be by the co-operation of this motion with another motion that a more restricted regulation is effected, and this independent motion may be derived from any moving parts of the engine other than the lifter—that is, the piston-rod, the beam, crank-shaft, &c., and other mechanism than the connecting and disconnecting catch may be used in the transferring the weight from the mechanism that lifts it to the mechanism that regulates its fall, and other mechanism than this for regulating its fall and raising it may be used, and other valve-motions may be used in carrying out this invention, and other means of adjusting the action of the independent motion may be substituted for that here shown.

What I claim as new, and desire to secure Letters Patent, is—

Adjusting the expansion of steam in steam-engines, with the aid of an independent motion, to determine when a weight or spring shall commence to close a separate moving cut off valve for each end of the cylinder.

FREDERICK E. SICKELS.

Witnesses:

C. W. GEDDES,

F. S. MYER.